J. LAUER.
Velocipede.
No. 92,976.          Patented July 27, 1869.
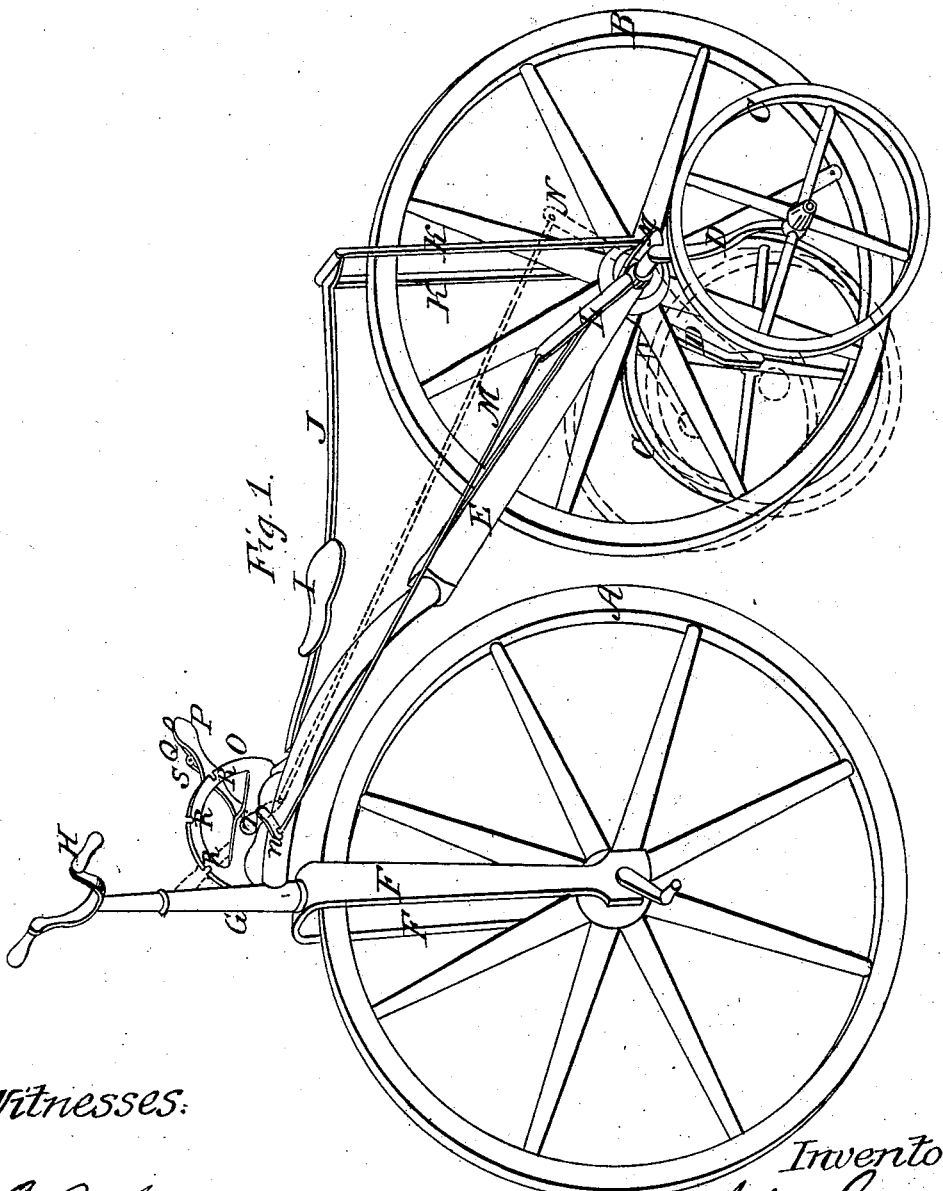

United States Patent Office.

JOHN LAUER, OF CHICAGO, ILLINOIS.

Letters Patent No. 92,976, dated July 27, 1869.

---

IMPROVEMENT IN VELOCIPEDES.

---

The Schedule referred to in these Letters Patent and making part of the same.

---

*To all whom it may concern:*

Be it known that I, JOHN LAUER, of Chicago, in the county of Cook, and State of Illinois, have invented an Improved Velocipede; and I do hereby declare that the following is a full, clear, and exact description thereof, reference being had to the accompanying drawings, and letters marked thereon, making a part of this specification, in which—

Figure 1 is a perspective representation of my invention.

The nature of the present invention consists in combining, with a velocipede, auxiliary wheels for keeping it from upsetting, connecting-rods, levers, and a disk for operating them, and a spring-seat, attached to a spring-standard, as the whole is hereinafter fully shown.

A represents the forward, and B, the rear wheel of an ordinary velocipede, said wheels being connected by a reach, E, and guide-standard, F, in the usual manner.

D D, curved arms, which extend out from the axle *m* of the wheel B, and support an auxiliary wheel, C, on each side of said wheel B.

These wheels are arranged to be raised and lowered by means of the following devices:

A lever, L, is attached to the axle *m*, and its outer end is jointed to a connecting-rod, M, which extends forward, and fastens to a connecting-rod, *n*, attached to a shaft, T.

This shaft has a bearing in a disk or plate, O, and to its opposite end is fastened a lever, P, which is used by the operator to fix the position of the wheels C.

A spring-catch, Q S, attached to said lever, locks into notches R in the disk, and thus holds the lever in place, and also the wheels C.

The rear end of the reach E supports two spring-standards, K, to the ends of which is jointed a spring-seat bar, J, supporting a seat, I.

By this means, a much more comfortable seat is provided than when horizontal springs are the only ones employed, inasmuch as a much greater length of spring can be used, while at the same time the operator is materially relieved from both a vertical and horizontal jar.

The operation is very simple, requiring only that the operator start the velocipede in the usual manner, with the wheels C bearing upon the track. Then, when a sufficient motion is attained, bring the lever P one notch forward on the disk R O. This will raise the wheels C about four inches above the track, as shown by dotted lines N, and enable the operator to run on the wheels A B, and to pass over rutty and uneven ground without being readily upset.

By moving the lever P one notch further, the wheels C will be so raised up as to be carried entirely above the ground.

Having thus described my invention,

What I claim, and desire to secure by Letters Patent of the United States, is—

The combination of the wheels A B, reach E, connecting-rod M, lever P, disk O, standard F F, spring-standards K, spring-seat plate J, and seat I, all combined, arranged, and operating as herein shown and described.

JOHN LAUER.

Witnesses:
 E. E. GIBSON,
 JAS. NORGENT.